Dec. 21, 1937.   H. A. ACY   2,102,987
AUTOMOBILE REAR ADVERTISING CARRIER
Filed July 6, 1937
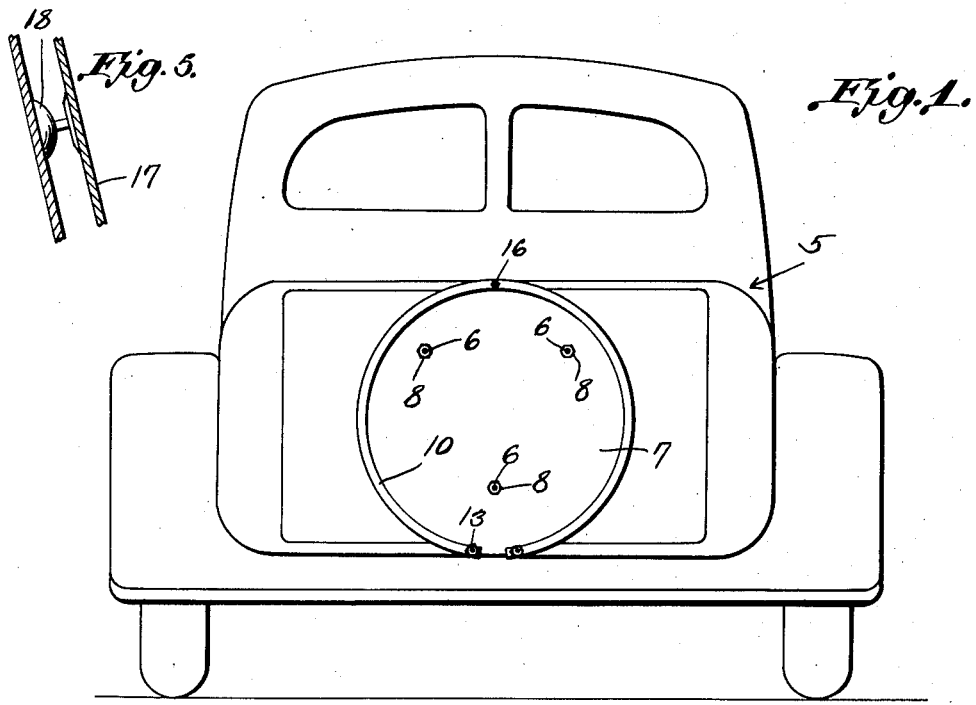
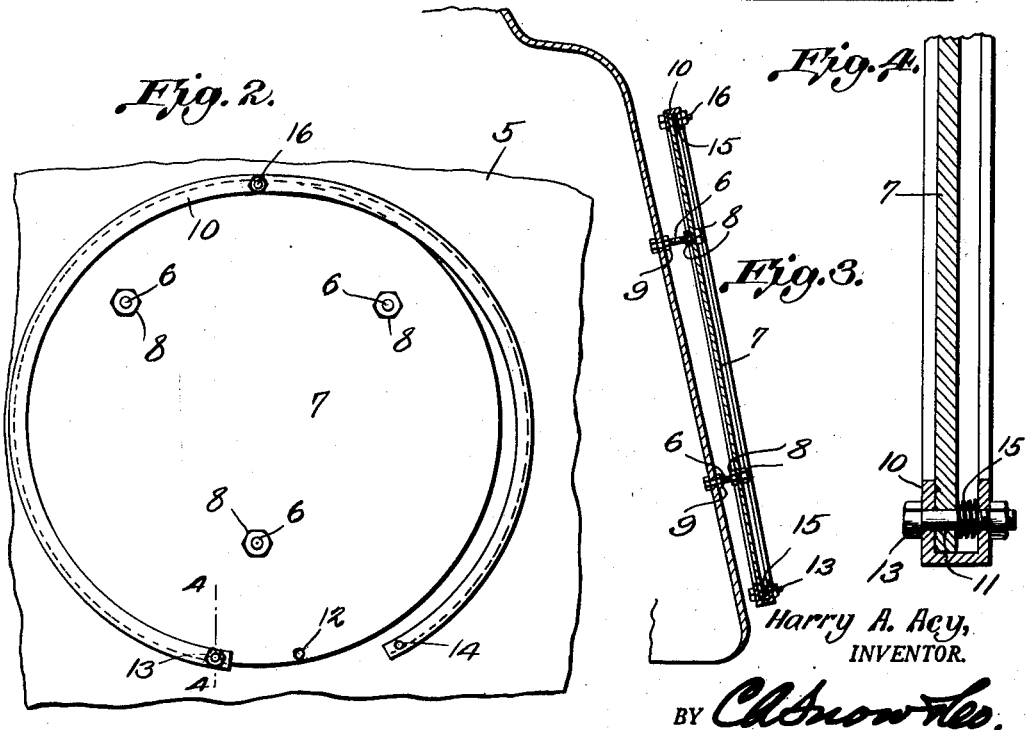
Harry A. Acy,
INVENTOR.

Patented Dec. 21, 1937

2,102,987

UNITED STATES PATENT OFFICE 2,102,987

AUTOMOBILE REAR ADVERTISING CARRIER

Harry Armour Acy, Louisville, Ky.

Application July 6, 1937, Serial No. 152,039

4 Claims. (Cl. 40—129)

This invention relates to a carrier designed for use on motor vehicles, the carrier being constructed to support an advertising card or poster in such a way that the advertising card or poster will be securely held in place against vibrating or moving with respect to the carrier while the vehicle is in motion, due consideration being given to the construction of the carrier, to permit the mounting or removal of the advertising card or poster, with facility.

An important object of the invention is the provision of a carrier of this character which is of a construction to permit water to pass readily therefrom, thereby insuring against damage to the advertising card or poster by the collection of water in the carrier.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a rear elevational view a motor vehicle, equipped with a card or poster carrier, constructed in accordance with the invention.

Figure 2 is a rear elevational view of the carrier, the securing ring of the carrier, being shown as in its open position to receive the advertising card or poster.

Figure 3 is a vertical sectional view through the rear section of a motor vehicle, equipped with the carrier.

Figure 4 is an enlarged fragmental detail view through the carrier body and ring thereof.

Figure 5 is a fragmental sectional view illustrating the use of suction cups in supporting the carrier.

Referring to the drawing in detail, the reference character 5 designates the rear end of the body of a motor vehicle, to which the advertising card or poster carrier, is secured.

The advertising card carrier which is preferably circular in formation, is shown as secured to the rear of the motor vehicle body, by means of the bolts 6, which extend through openings in the body portion and through the carrier body portion indicated by the reference character 7, the bolts being provided with nuts 8 by means of which the body portion may be adjusted with respect to the rear end of the body of the vehicle supporting the carrier. Nuts 9 secure the opposite ends of the bolts 6 to the body portion of the vehicle, as clearly shown by Figure 3 of the drawing.

The split ring member which is indicated by the reference character 10 is substantially channel shaped in cross section, the space between the walls of the channel being appreciably greater than the thickness of the body portion 7 of the carrier, so that a space is provided between the carrier body 7 and one flange of the ring member 10. This space is provided for the reception of the advertising card or poster which is to be supported in the carrier, it being understood that the advertising card or poster will be of the same general construction as the body portion 7 of the carrier, and of a diameter to fit between the body portion 7 and one flange of the split channel ring 10, where it will be securely held in position.

Openings 11 and 12 are formed in the body portion 7 of the carrier, near the lower edge of the body portion, as shown by Figure 2 of the drawing. The opening 11 is designed to receive the bolt 13 which extends through aligning openings in the flanges of the split ring member 10, securing one end of the split ring member to the body portion 7 of the carrier.

It might be further stated, that this split ring member is constructed of yieldable metal, so that when the ends of the split ring member are released from the body portion 7 of the carrier, the ends will spring outwardly, with the result that the advertising card or poster may be readily and easily inserted or removed from the carrier.

A bolt of a construction similar to the bolt 13, extends through the openings 14 at the opposite end of the split ring member 10, the latter bolt passing through the opening 12, to secure the ends of the split ring member 10 in position on the body portion 7 of the carrier. Coiled springs 15 are positioned on the bolts, and bear against the card or poster held in the carrier, forcing the card or poster into close engagement with the body portion 7 of the carrier eliminating any possibility of the card or poster moving with respect to the body portion 7.

In order that the card or poster will be more securely held in position, a bolt indicated by the reference character 16, is extended through the channel bar material, at a point near the upper central portion of the split ring member, and this bolt is also supplied with a spring corresponding to the spring member 15, for securing that portion of the card or poster.

From the foregoing it will be obvious that due to the construction shown and described, I have provided a carrier for use in connection with motor vehicle bodies, which will securely hold a card or poster for advertising purposes, and one which will permit the card or poster to be readily and easily removed or replaced at the will of the operator.

Referring to Figure 5 of the drawing, the body portion of the carrier, which is indicated by the reference character 17, is provided with suction cups 18, providing means whereby the body portion or carrier may be readily and easily secured to any suitable supporting surface, eliminating the necessity of providing openings in the supporting surface to receive bolts, such as used in the preferred form of the invention.

I claim:

1. A carrier of the class described comprising a body portion, means for securing the body portion to a supporting surface, a split ring member removably secured to the periphery of the body portion and adapted to engage an advertising card positioned on the body portion, securing the advertising card to the body portion, and yieldable means adapted to engage the advertising card for restricting movement of the advertising card with respect to the body portion.

2. A carrier of the class described comprising a body portion, means for securing the body portion to a supporting surface, a split ring member embodying spaced flanges adapted to house the periphery of the body portion, said flanges being spaced to accommodate an advertising card, means for removably securing the split ring member to the body portion, and means carried by the split ring member for contacting the card held in the carrier.

3. A carrier of the class described comprising a body portion, means for securing the body portion to a supporting surface, said body portion having openings near the lower edge thereof, a split ring member embodying spaced flanges adapted to house the periphery of the body portion, means at one end of the split ring member for removably securing the split ring member to the body portion, means at the opposite end of the ring member for securing this end of the ring member to the body portion, said means including bolts fitted in the openings, and yieldable means on the bolts adapted to engage an advertising card positioned on the body portion, securely holding the card in position on the body portion.

4. A carrier of the class described comprising a body portion, means for securing the body portion to a supporting surface, a split band embodying spaced flanges, fitted around the periphery of the body portion, the ends of the split band being disposed in spaced relation with respect to each other, means for securing the split band to the body portion, and said split band adapted to engage a card positioned on the body portion for removably securing the card to the body portion.

HARRY ARMOUR ACY.